United States Patent
Pullela et al.

(10) Patent No.: US 9,667,293 B2
(45) Date of Patent: *May 30, 2017

(54) SAW-LESS, LNA-LESS LOW NOISE RECEIVER

(71) Applicant: Skyworks Solutions, Inc., Woburn, MA (US)

(72) Inventors: Rajasekhar Pullela, Irvine, CA (US); William J. Domino, Yorba Linda, CA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,817

(22) Filed: May 21, 2015

(65) Prior Publication Data
US 2015/0333785 A1    Nov. 19, 2015

Related U.S. Application Data

(63) Continuation of application No. 13/232,873, filed on Sep. 14, 2011, now Pat. No. 9,071,325, which is a
(Continued)

(51) Int. Cl.
*H04B 1/16* (2006.01)
*H04B 1/00* (2006.01)
*H04B 1/10* (2006.01)

(52) U.S. Cl.
CPC ........... *H04B 1/1638* (2013.01); *H04B 1/006* (2013.01); *H04B 1/1018* (2013.01)

(58) Field of Classification Search
CPC .................. H03D 3/002; H03D 3/006; H03D 2200/0086; H03D 2200/0088;
(Continued)

(56) References Cited

U.S. PATENT DOCUMENTS 4,162,378 A * 7/1979 Baudoux ............... H04L 5/1423
370/290
5,724,000 A * 3/1998 Quinn .................. H03H 19/004
327/554
(Continued)

FOREIGN PATENT DOCUMENTS

JP          09-036771        2/1997
JP       2004-328254 A     11/2004
(Continued)

OTHER PUBLICATIONS

Moseley et al., A 400-to-900 MHz Receiver with Dual-domain Harmonic Rejection Exploiting Adaptive Interference Cancellation, Powerpoint slideshow, Copyright date listed 2009, 31 pages.
(Continued)

*Primary Examiner* — Young T Tse
(74) *Attorney, Agent, or Firm* — Knobbe, Martens, Olson & Bear LLP

(57) ABSTRACT

A low noise receiver includes a downconverter configured to receive a radio frequency (RF) signal, the downconverter comprising a switching architecture configured to generate a plurality of output phases based on a respective plurality of local oscillator (LO) signals, a differencing circuit configured to combine the plurality of output phases such that an nth output phase is differenced with an (n+K)th output phase, resulting in gain-added output phases, and a summation filter configured to receive the gain-added output phases and configured to combine the gain-added output phases such that a response of the receiver effectively reduces odd harmonics of the RF signal.

24 Claims, 14 Drawing Sheets

Related U.S. Application Data continuation of application No. PCT/US2009/068212, filed on Dec. 16, 2009.

(60) Provisional application No. 61/160,858, filed on Mar. 17, 2009.

(58) Field of Classification Search
CPC .... H03D 2200/009; H04B 1/006; H04B 1/10; H04B 1/1009; H04B 1/1018; H04B 1/1027; H04B 1/109; H04B 1/16; H04B 1/1615; H04B 1/1638
USPC ....... 375/316, 318, 326, 328–332, 349, 350; 327/355, 359, 361, 407, 408, 410, 413, 327/552, 554, 559; 329/304–310, 346; 455/306, 311, 335, 338, 341
See application file for complete search history.

(56) References Cited

U.S. PATENT DOCUMENTS

| | | |
|---|---|---|
| 7,386,290 B2 | 6/2008 | Li et al. |
| 8,072,255 B2 | 12/2011 | Cicalini |
| 9,071,325 B2 | 6/2015 | Pullela et al. |
| 2005/0091493 A1 | 4/2005 | Hirata |
| 2005/0170806 A1 | 8/2005 | Kim |
| 2005/0239430 A1 | 10/2005 | Shah |
| 2007/0129038 A1 | 6/2007 | Ragan et al. |
| 2007/0241821 A1 | 10/2007 | Dally et al. |
| 2008/0242252 A1 | 10/2008 | Youssoufian |
| 2008/0284487 A1 | 11/2008 | Pullela et al. |
| 2009/0088122 A1 | 4/2009 | Xu et al. |
| 2009/0111420 A1 | 4/2009 | Tasic et al. |
| 2009/0325510 A1 | 12/2009 | Pullela et al. |
| 2010/0029323 A1 | 2/2010 | Tasic et al. |

FOREIGN PATENT DOCUMENTS

| | | |
|---|---|---|
| JP | 2006-352441 A | 12/2006 |
| JP | 2008-523734 A | 7/2008 |
| KR | 10-2006-0070851 | 6/2006 |
| KR | 10-2008-0067166 | 7/2008 |
| WO | WO 2009/003101 A2 | 12/2008 |
| WO | WO 2009/158272 A2 | 12/2009 |
| WO | WO 2010/089700 A1 | 8/2010 |
| WO | WO 2010/107460 | 9/2010 |
| WO | WO 2012/002026 A | 1/2012 |

OTHER PUBLICATIONS

Moseley et al., A 400-to-900 MHz Receiver with Dual-domain Harmonic Rejection Exploiting Adaptive Interference Cancellation, Feb. 10, 2009.
Examination report issued in Application No. GB1117873.8, dated Jun. 27, 2014, in 4 pages.
International Search Report, re International Application No. PCT/US2009/068212, dated Jul. 19, 2010.
International Preliminary Report on Patentability and Written Opinion, re International Application No. PCT/US2009/068212, dated Sep. 20, 2011.

\* cited by examiner ded with an (n+K)th output phase, resulting in gain-added output phases, and a summation filter configured to receive the gain-added output phases and configured to combine the gain-added output phases such that a response of the receiver effectively reduces odd harmonics of the RF signal.

SAW-LESS, LNA-LESS LOW NOISE RECEIVER

CROSS-REFERENCE TO RELATED APPLICATIONS

This application is a continuation of U.S. patent application Ser. No. 13/232,873, filed Sep. 14, 2011, which is a continuation of International Application No. PCT/US2009/068212, filed Dec. 16, 2009, which claims priority to and the benefit of the filing date of U.S. Provisional Patent Application No. 61/160,858, filed Mar. 17, 2009, the benefits of the filing dates of which are hereby claimed and the specifications of which are incorporated herein by this reference.

BACKGROUND

Portable communication devices, such as cellular telephones, personal digital assistants (PDAs), WIFI transceivers, and other communication devices transmit and receive communication signal at various frequencies. For efficient communication, the frequency of the transmit and receive signals is many times higher than the baseband information signal that carries the information to be communicated. Therefore, a transceiver must upconvert the transmit signal and downconvert the receive signal.

Usually, one or more mixers are used to upconvert the transmit signal and downconvert the receive signal. In many radio frequency (RF) communication methodologies, and in a quadrature modulation methodology in particular, a mixer can be implemented using a series of switches that switch differential components of a quadrature signal according to a local oscillator (LO) signal. The frequency of the LO signal is chosen so that a radio frequency signal mixed with the LO signal is converted to a desired frequency.

Signal upconversion and signal downconversion is performed by using mixers, which are typically implemented using semiconductor switches. In deep sub-micron technology the availability of passive switches providing low noise operation and highly efficient operating characteristics enables the use of passive mixers where low current consumption and high performance is desired. Rail to rail voltages used in the switch clock path and issues due to poor isolation between the in-phase (I) and quadrature-phase (Q) paths in the mixer impose limitations on the use of a passive mixer.

A SAW filter is typically used to protect the receive frequency band from interfering signals that may be out of the receive band, but that may still cause interference, particularly at certain multiples (harmonics) of the receive frequency. An LNA is typically used to amplify the relatively weak receive signal so that the information contained therein can be extracted. For a multiband receiver, a separate SAW filter is needed for each band, and a separate LNA is needed to accept the output of each SAW filter. Thus SAW filters and LNAs typically add complexity to the receiver architecture. Further, the LNAs consume power, and this power consumption must be sufficiently high to allow the LNAs to pass large blocking signals without compressing small desired signals.

Therefore, it would be desirable to have a low noise receiver architecture that may not rely on these additional elements.

SUMMARY

Embodiments of a low noise receiver include a downconverter configured to receive a radio frequency (RF) signal, the downconverter comprising a switching architecture configured to generate a plurality of output phases based on a respective plurality of local oscillator (LO) signals, a differencing circuit configured to combine the plurality of output phases such that an nth output phase is differenced with an (n+K)th output phase, resulting in gain-added output phases, and a summation filter configured to receive the gain-added output phases and configured to combine the gain-added output phases such that a response of the receiver effectively reduces odd harmonics of the RF signal.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
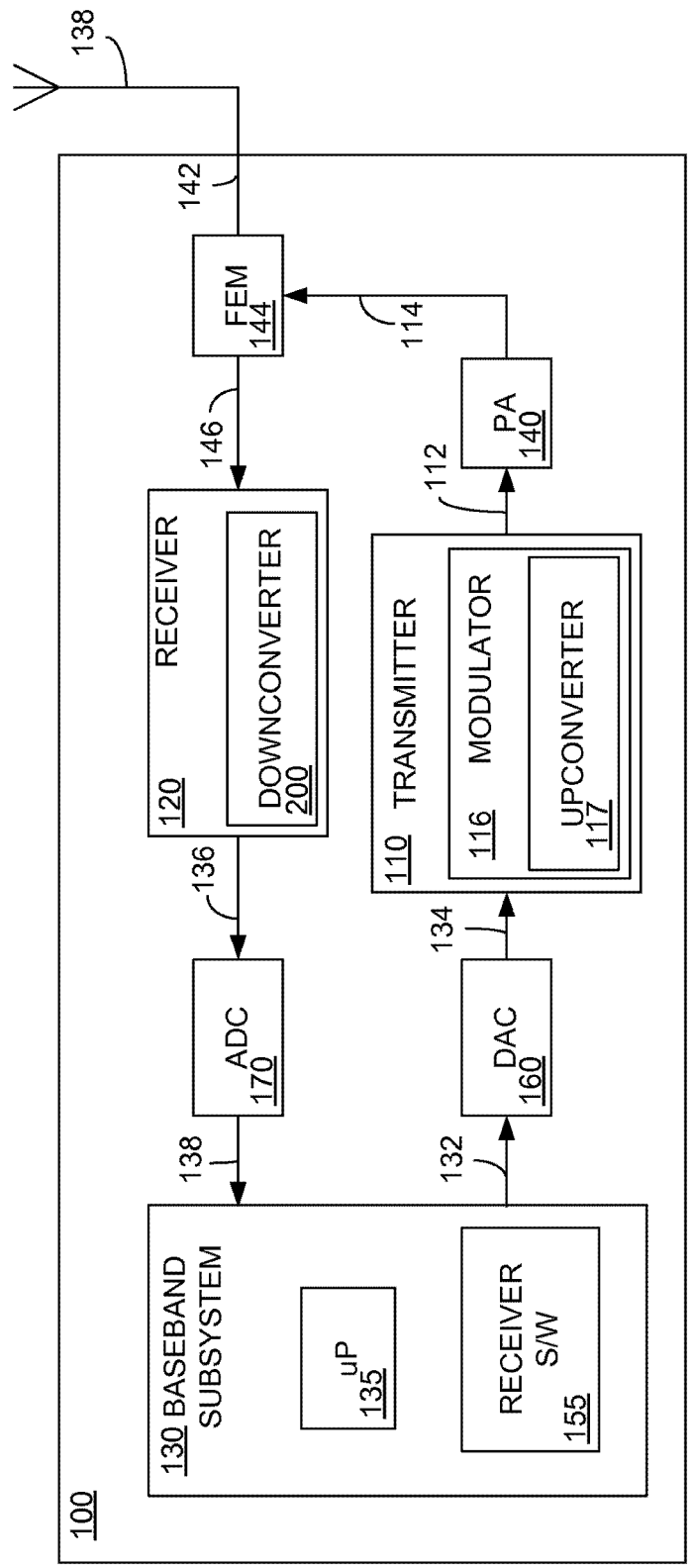
FIG. 1 is a block diagram illustrating a simplified portable transceiver.

Although described with particular reference to a portable transceiver, the SAW-less, LNA-less low noise receiver (also referred to herein as the low noise receiver), can be used in any device that uses signal downconversion in a receiver.

For a quad-band communication device operating in the GSM/EDGE frequency spectrum, the low noise receiver described herein eliminates four external SAW filters and on-chip low noise amplifiers (LNAs) that are typically used in quad-band cell phone solutions, leading to large cost and area savings. The elimination of the SAW filters and LNAs is achieved, at least in part, by implementing the highly linear, low noise, passive, mixer architecture mentioned above, and partly by the careful design of input and output matching circuitry.

The low noise receiver can be implemented in hardware, or a combination of hardware and software. When implemented in hardware, the passive mixer and high Q RF filter using a passive mixer can be implemented using specialized hardware elements and logic. When the low noise receiver is implemented partially in software, the software portion can be used to precisely control the various components. The software can be stored in a memory and executed by a suitable instruction execution system (microprocessor). The hardware implementation of the low noise receiver can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for low noise receiver comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 1 is a block diagram illustrating a simplified portable transceiver 100. Embodiments of the low noise receiver can be implemented in any RF receiver, RF transmitter or RF transceiver, and in this example, are implemented in an RF receiver 120 associated with a portable transceiver 100. The portable transceiver 100 illustrated in FIG. 1 is intended to be a simplified example and to illustrate one of many possible applications in which the low noise receiver can be implemented. One having ordinary skill in the art will understand the operation of a portable transceiver. The portable transceiver 100 includes a transmitter 110, a receiver 120, a baseband subsystem 130, a digital-to-analog converter (DAC) 160 and an analog-to-digital converter (ADC) 170. The transmitter 110 includes a modulator 116 and an upconverter 117. In an embodiment, the upconverter 117 can be a subsystem of the modulator 116. In alternative embodiments, the upconverter 117 can be a separate circuit block or circuit element.

The transmitter also includes any other functional elements that modulate and upconvert a baseband signal. The receiver 120 includes filter circuitry and a downconverter 200 that enable the recovery of the information signal from the received RF signal. The downconverter 200 implements portions of and embodiments of the low noise receiver, as described herein.

The portable transceiver 100 also includes a power amplifier 140. The output of the transmitter 110 is provided over connection 112 to the power amplifier 140. Depending on the communication methodology, the portable transceiver may also include a power amplifier control element (not shown).

The receiver 120 and the power amplifier 140 are connected to a front end module 144. The front end module 144 can be a duplexer, a diplexer, or any element that separates the transmit signal from the receive signal. The front end module 144 also contains appropriate band switching devices to control the application of a received signal to the receiver 120. The front end module 144 is connected to an antenna 138 over connection 142.

In transmit mode, the output of the power amplifier 140 is provided to the front end module 144 over connection 114. In receive mode, the front end module 144 provides a receive signal to the receiver 120 over connection 146.

If portions of the low noise receiver are implemented in software, then the baseband subsystem 130 also includes receiver software 155 that can be executed by a microprocessor 135, or by another processor, to control at least some of the operation of the low noise receiver to be described below.

When transmitting, the baseband transmit signal is provided from the baseband subsystem 130 over connection 132 to the DAC 160. The DAC 160 converts the digital baseband transmit signal to an analog signal that is supplied to the transmitter 110 over connection 134. The modulator 116 and the upconverter 117 modulate and upconvert the analog transmit signal according to the modulation format prescribed by the system in which the portable transceiver 100 is operating. The modulated and upconverted transmit signal is then supplied to the power amplifier 140 over connection 112.

When receiving, the filtered and downconverted receive signal is supplied from the receiver 120 to the ADC 170 over connection 136. The ADC digitizes the analog receive signal and provides the analog baseband receive signal to the baseband subsystem 130 over connection 138. The baseband subsystem 130 recovers the received information.

Figure 2:
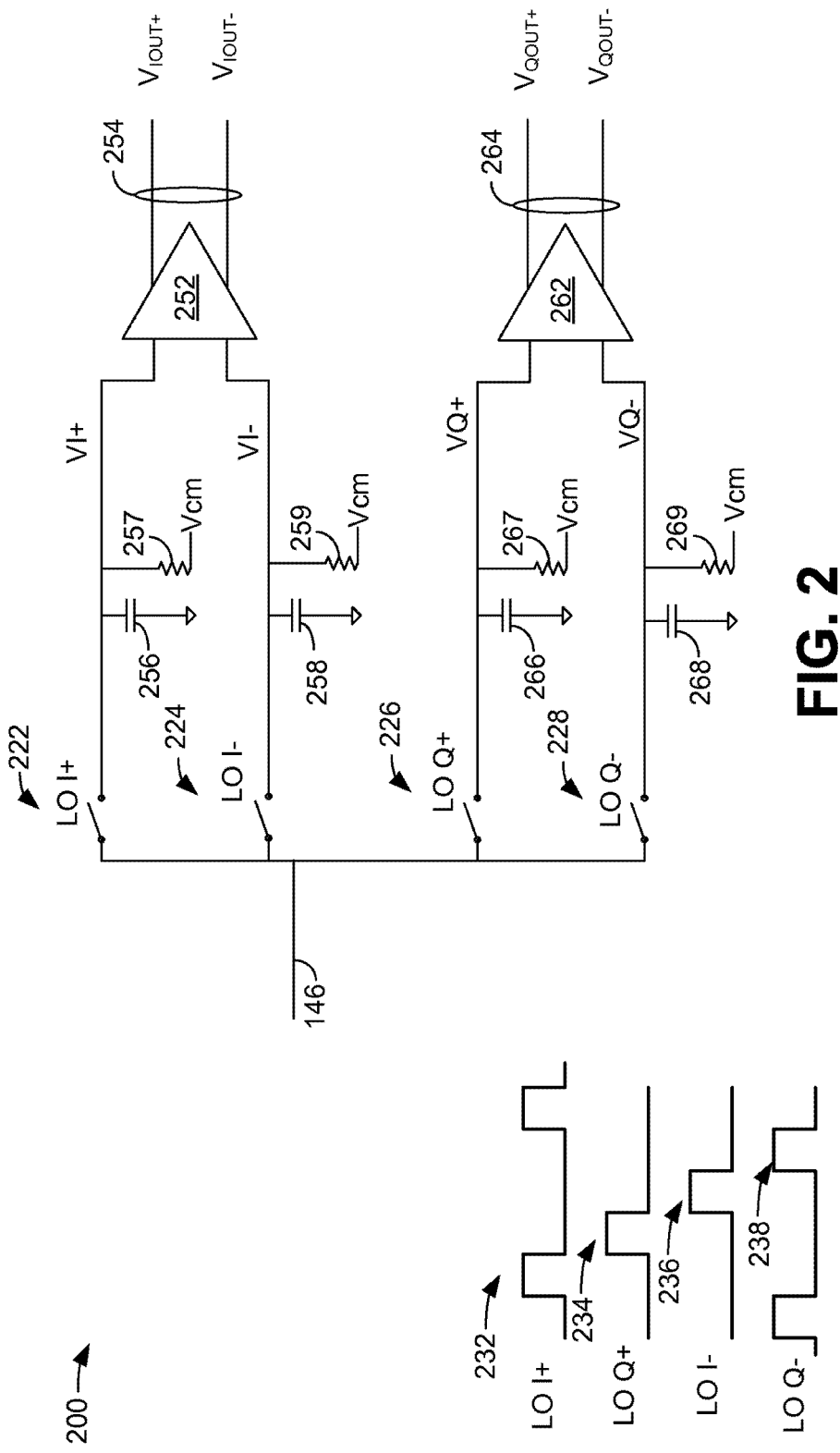
FIG. 2 is a schematic diagram of an embodiment of a known single-ended voltage-mode downconverter implemented as a passive mixer using an approximate 25% duty cycle topology.

FIG. 2 is a schematic diagram of an embodiment of a known single-ended voltage-mode downconverter implemented as a passive mixer using an approximate 25% duty cycle topology. A passive mixer is an example of an implementation of the downconverter 200 of FIG. 1. Although voltage mode operation is illustrated in the embodiment shown in FIG. 2, a current mode implementation can also be used. FIG. 2 illustrates an example of utilizing 25% duty cycle LO signals to control the mixer switching. In practice less than 25% duty cycle might be desirable to prevent overlap between the on-times of the switches.

In a voltage mode mixer implementation, such as shown in FIG. 2, reducing the duty cycle to 20% or below is possible, but it also quickly reaches the point of diminishing returns where noise contributions due to aliasing of undesired input signals or noise around harmonics of the LO frequency degrade performance. Duty cycle between 20-25% is chosen in this implementation. In the topology shown in FIG. 2, LO and 2LO multiplication (described in greater detail in FIG. 3) is done in the LO path rather than the RF path.

The voltage signal on connection 146 is provided to switches 222, 224, 226 and 228. The switches 222, 224, 226 and 228 can be implemented using any switch technology such as, for example, bipolar junction transistor (BJT) technology, field effect transistor (FET) technology, or any other switching technology. The switches 222, 224, 226 and 228 can also be implemented using pass gates, each of which are typically implemented by a combination of an NFET and PFET transistor, as known in the art. The switches 222, 224, 226 and 228 are illustrated in FIG. 2 as simple single-pole single-throw switches to illustrate that any type of switches can be used to generate the switching signals described herein.

In the embodiment described herein, the in-phase (I) and quadrature-phase (Q) signals are differential. Therefore, the I signal includes a $V_{I+}$ signal and a $V_{I-}$ signal. Similarly, the Q signal includes a $V_{Q+}$ signal and a $V_{Q-}$ signal. The switch 222 generates the I+ signal, the switch 224 generates the I− signal, the switch 226 generates the Q+ signal and the switch 228 generates the Q− signal. The clock signals that drive the switches 222, 224, 226 and 228 are illustrated as having a 25% duty cycle and can be generated as will be described below. The clock signal 232 drives the switch 222, the clock signal 234 drives the switch 226, the clock signal 236 drives the switch 224 and the clock signal 238 drives the switch 228. In accordance with providing an approximate 25% duty cycle topology, none of the clock signals 232 through 238 have any time period during which they overlap, or which are positive at the same time.

The output of the switch 222 is terminated by a capacitance 256 and a resistance 257, and is provided to one input of the amplifier 252. The output of the switch 224 is terminated by a capacitance 258 and a resistance 259, and is provided to the other input of the amplifier 252. The output of the switch 226 is terminated by a capacitance 266 and a resistance 267, and is provided to one input of the amplifier 262. The output of the switch 228 is terminated by a capacitance 268 and a resistance 269, and is provided to the other input of the amplifier 262. The output of the amplifier 252 on connection 254 is the differential $V_{I+}$ and $V_{I-}$ output signal; and the output of the amplifier 262 on connection 264 is the differential $V_{Q+}$ and $V_{Q-}$ output signal.

Figure 3:
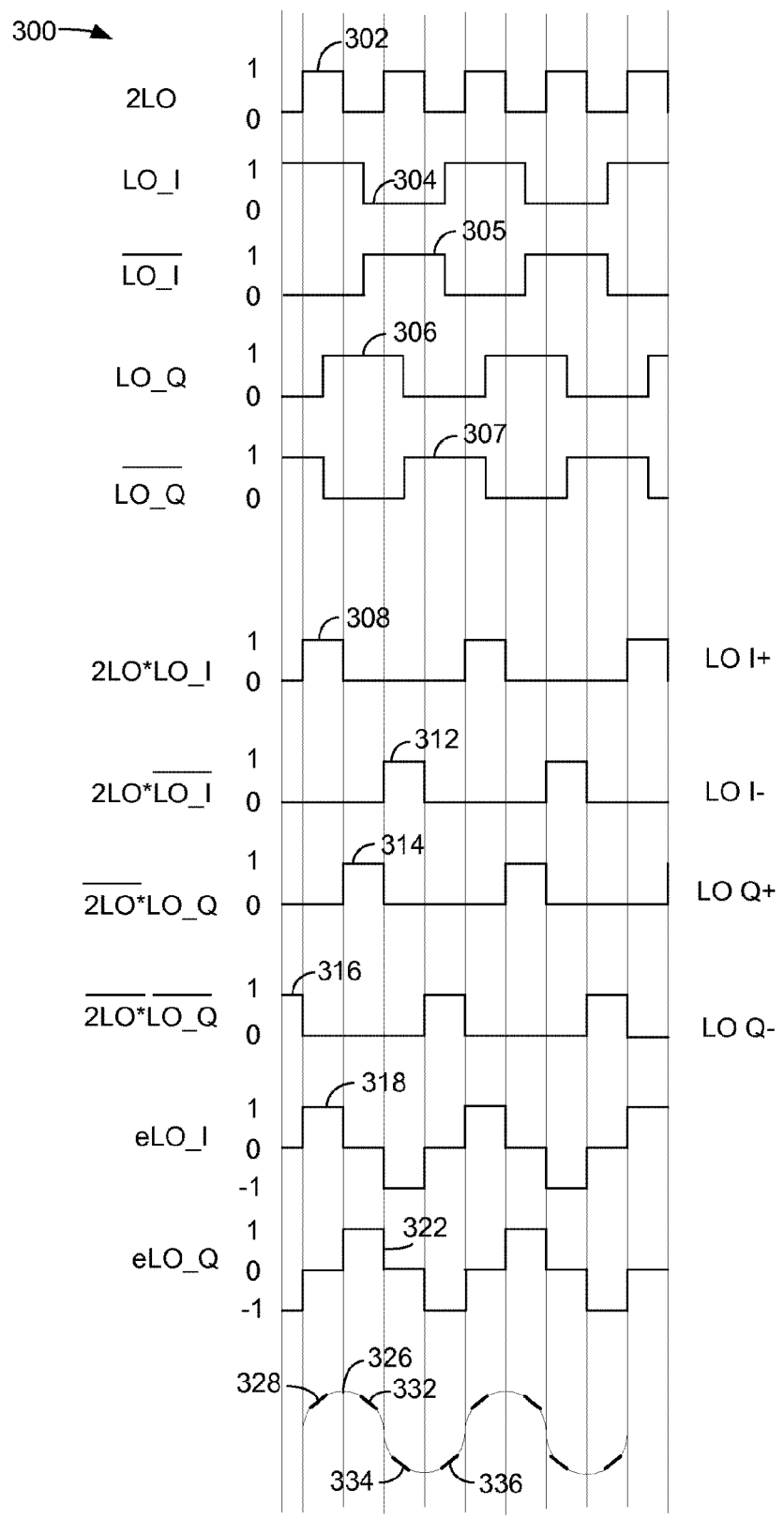
FIG. 3 is a graphical illustration showing the LO signals used in an embodiment of the passive mixer described in FIG. 2.

FIG. 3 is a graphical illustration showing the LO signals utilized by an embodiment of the passive mixer 200 described in FIG. 2. The in-phase LO signal includes differential components LO_I and $\overline{LO\_I}$. The quadrature-phase LO signal includes differential components LO_Q and $\overline{LO\_Q}$. The 2LO signal is an LO signal that occurs at twice the frequency of the I and Q LO signals. The inverse of the 2LO signal is referred to as $\overline{2LO}$.

The 2LO signal is shown at trace 302, the LO_I signal is shown at trace 304, and the $\overline{LO\_I}$ signal is shown as trace 305. The LO_Q signal is shown at trace 306 and the $\overline{LO\_Q}$ signal is shown as trace 307. These five signals are combined as follows to generate the four LO waveforms that are applied to the downconverter 200.

The 2LO*LO_I signal is shown at trace 308. The signal 308 represents the LO_I+ signal. The 2LO*$\overline{LO\_I}$ signal is shown at trace 312. The signal 312 represents the LO_I− signal. The $\overline{2LO}$ *LO_Q signal is shown at trace 314. The signal 314 represents the LO_Q+ signal. The $\overline{2LO}$ *$\overline{LO\_Q}$ signal is shown at trace 316. The signal 316 represents the LO_Q− signal.

The effective in-phase differential LO signal, eLO_I, is shown as trace 318 and the effective quadrature-phase differential LO signal, eLO_Q, is shown as trace 322. These signals are derived respectively as LO_I+−LO_I− and LO_Q+−LO_Q−. As shown in FIG. 3, the effective in-phase differential LO signal, eLO_I, 318 and the effective quadrature-phase differential LO signal, eLO_Q, 322 provide an approximate 25% duty cycle at each polarity and ensure that switching takes place only on the transitions of the 2LO signal 302, thus minimizing any influence of switching noise, and minimizing any I and Q signal overlap due to the LO_I signal 304 and the LO_Q signal 306. The trace 326 is a continuous-wave example showing the sampling of an RF input signal by the I+ signal 328, the Q+ signal 332, the I− signal 334 and the Q− signal 336.

Figure 4:
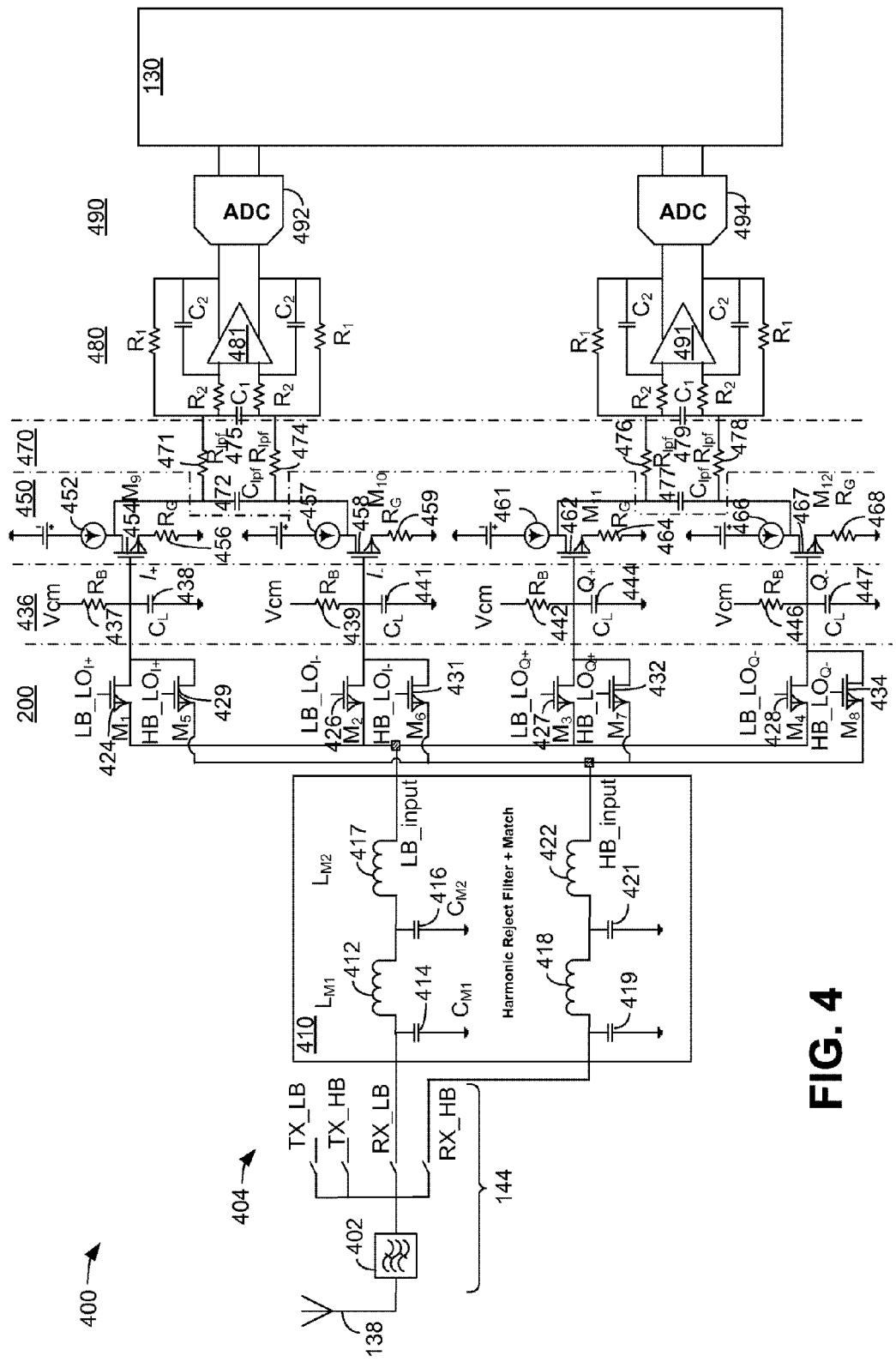
FIG. 4 is a schematic diagram illustrating an embodiment of a low noise receiver.

FIG. 4 is a schematic diagram illustrating an embodiment of a low noise receiver 400. According to the 3GPP standard, the low noise receiver 400 should be able to demodulate a desired signal at strength of approximately −99 dBm, in the presence of a 0 dBm out-of-band non-spurious blocker at greater than 20 MHz offset from the desired receive frequency, or in the presence of a −43 dBm out-of-band spurious blocker, such as one that may occur at a harmonic of the desired receive frequency.

The low noise receiver 400 receives a signal from an antenna 138 that supplies the received signal to a front end module 144. The front end module 144 comprises, in this example, an antenna filter 402 that supplies the filtered signal to a transmit receive (T/R) switch module 404. In the embodiment shown in FIG. 4, the T/R switch module 404 is a single pole four-throw (SPFT) switch that switches transmit high band, transmit low band (circuitry not shown for simplicity); and receive high band and receive low band. In this quad-band example, the transmit receive switch module 404 can be implemented using any type of switches as known in the art.

The receive signal is provided from the appropriate switch element within the T/R switch module 404 to a low pass filter module 410. In the embodiment shown in FIG. 4, the low pass filter module 410 includes circuitry for both the receive low band and the receive high band. The low pass filter module 410 operates as a harmonic reject filter, and as an impedance matching network. The low pass filter module 410 attenuates out of band blocking signals that may occur at an odd harmonic, for example the third and fifth harmonic, of the desired receive frequency; and also provides impedance matching from the T/R switch module 404 to the input of the downconverter 200. In an embodiment, the inductors 412 and 417 can have a value of 10 nanohenrys (nH) and the capacitors 414 and 416 can have a value of 3.0 picofarads (pF); and the inductors 418 and 422 can have a value of 3.3 nH and the capacitors 419 and 421 can have a value of 1.5 pF.

The low band filter circuitry comprises an inductor 412, a capacitor 414, an inductor 417 and a capacitor 416. Similarly, the high band filter circuitry comprises and inductor 418, a capacitor 419, an inductor 422 and a capacitor 421. In an embodiment, the low pass filter module 410 provides impedance matching from the relatively low impedance source to the relatively high impedance load and in the process, provides a voltage gain by acting as a step-up transformer, as known in the art. As an example, the input of the low pass module 410 has an impedance of approximately 50Ω, which should be matched to the approximate 400Ω impedance at the input to the downconverter 200. A filter network providing such a match will step up the voltage by SQRT(400/50), which in dB is 20*log (SQRT(400/50))=9 dB.

The low noise receiver 400 also includes an embodiment of the downconverter 200 shown in FIG. 2. In the example shown in FIG. 4, the downconverter 200 is a two band low noise passive mixer comprising transistor switches 424, 426, 427 and 428 for the low band and transistor switches 429, 431, 432 and 434 for the high band. Only the high band or low band switches are employed at a time, according to the band of operation. According to this embodiment, the transistor switches 424, 426, 427, and 428, or the transistor switches 429, 431, 432, and 434, are switched according to a 25% local oscillator (LO) duty cycle, with the LO waveforms and their phases as described in FIGS. 2 and 3. According to this operation, no two transistor switches in either of the high band or low band segments of the downconverter 200 will be operating at the same instant.

The 25% duty cycle LO drive for the transistor switches 424, 426, 427, and 428, or the transistor switches 429, 431, 432, and 434, provides isolation between the I and Q baseband outputs on the capacitors, $C_L$ of FIG. 4, by connecting only one of the capacitors to the single-ended RF input at any given instant. This prevents charge sharing between I and Q capacitors, enhancing mixer gain, noise figure (NF) and the quality factor (Q) of the band pass filtering response at the RF input of the downconverter 200. Single-ended to differential conversion in this voltage mode sample-and-hold topology has the advantage of approximately 6 dB of additional voltage gain. It can be shown that the gain in this topology approaches 5.1 dB due to the sample/hold mixer operation and single-ended to differential downconversion. Additional gain due to impedance step-up from approximately 50 ohm (Ω) to approximately 400Ω in the low pass filter 410 enhances the total gain to approximately 14.1 dB from antenna input to passive mixer output. It is noteworthy that this mixer gain is achieved without any active stages or bias current in the signal path. It should also be noted that this front-end design may benefit greatly from future technology scaling, as performance of the passive switches and mixer LO generation circuitry improves at lower gate lengths.

The output of the downconverter 200 is supplied to a resistive/capacitive (RC) filter network 436. Specifically, the output of the transistor 424 or 429 is supplied to resistor 437 and capacitor 438. The output of transistor 426 or 431 is supplied to resistor 439 and capacitor 441. The output of transistor 427 or transistor 432 is supplied to resistor 442 and capacitor 444, and the output of transistor 428 or transistor 434 is supplied to resistor 446 and capacitor 447.

The following description will be made with particular reference to the output of the transistor 424 and the filter network comprising resistor 437 and capacitor 438 and the output of the transistor 426 and the filter network comprising resistor 439 and capacitor 441 as an example only. The balance of the circuit performs in the same manner. The capacitor 438 performs a sample-and-hold function and performs single-ended to differential conversion for the signal output from the transistor 424. Each time the transistor 424 is conductive for the period of time corresponding to the 25% duty cycle described above, the output of transistor 424 is stored on capacitor 438 to provide the sample-and-hold function. Then, with example reference to the in-phase signal, the differential conversion is performed by the capacitor 438 and the capacitor 441. The capacitor 438 charges during the interval 328 (FIG. 3) and the capacitor 441 charges during the interval 334 (FIG. 3). Then, these outputs are differenced, resulting in a 2× magnitude because the signals are of opposite polarity. As an example, the value of the combined signals is approximately 6 dB.

Figure 5:
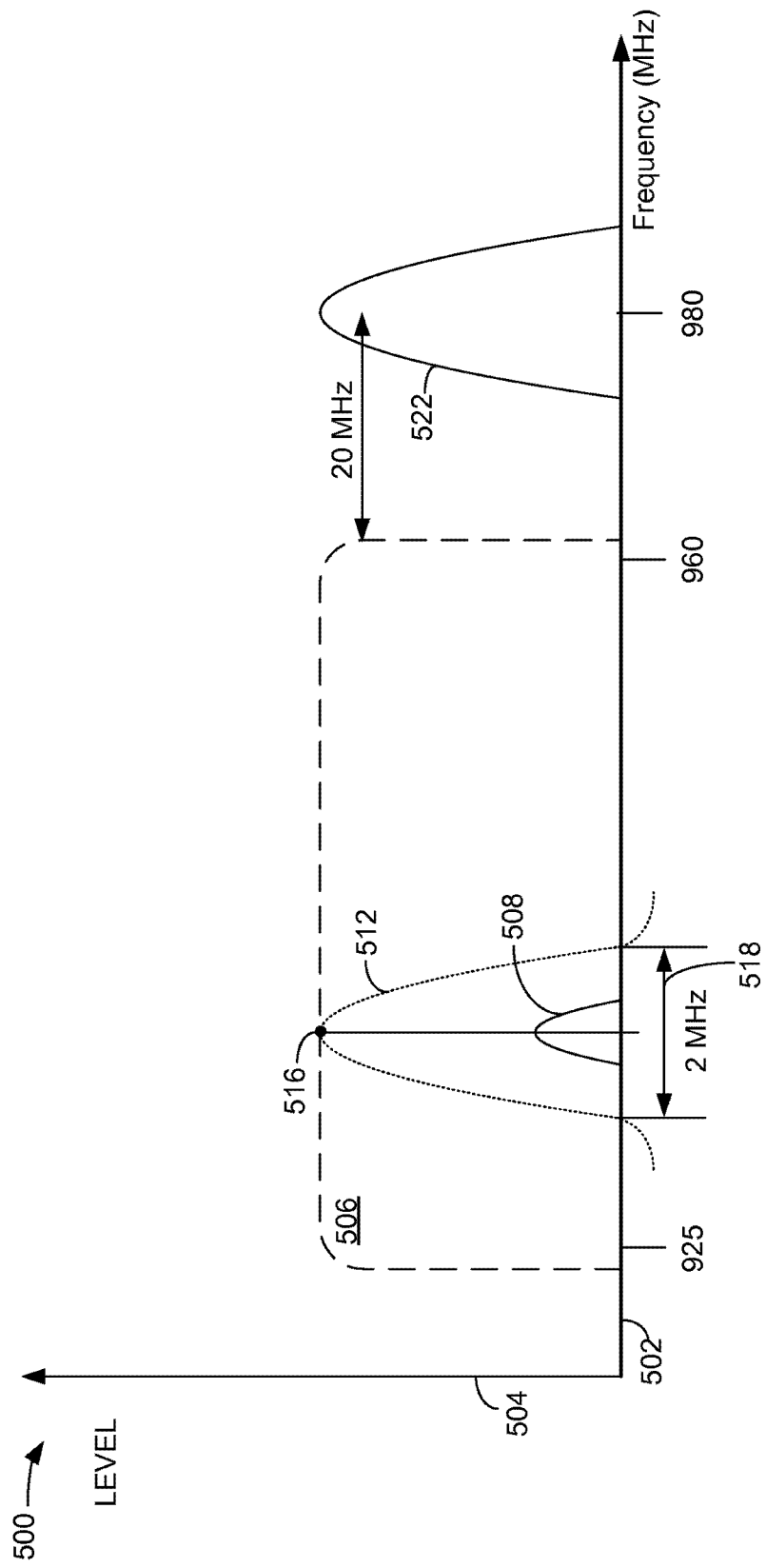
FIG. 5 is a graphical illustration showing an example frequency spectrum within which the low noise receiver operates.

The resistors 437 and 439 provide a common-mode voltage (Vcm) because a non-zero common-mode voltage is used in a differential system that uses a single supply voltage. The parallel combination of the capacitor 438, resistor 437 and the resistance through the transistor 424 forms an RC low pass filter. In an embodiment these element values are chosen to provide an RC low pass filter bandwidth of +/−1 MHz. It is this low pass filter response that is reflected through the downconverter 200 that causes a 2 MHz wide RF band pass response to appear at the input to the downconverter 200, as is illustrated in FIG. 5.

The output of the RC network 436 is then supplied to a high gain trans-admittance amplifier 450. In this embodiment, the low noise receiver comprises four instances of the high gain trans-admittance amplifier 450. The high gain trans-admittance amplifier 450 includes a current source 452, a transistor 454 and a resistor 456 configured to receive an output of the resistor 437 and capacitor 438. Similarly the output of the resistor 439 and capacitor 441 is supplied to a high gain trans-admittance amplifier comprising current source 457, transistor device 458 and resistor 459. Similarly, the output of the resistor 442 and the capacitor 444 is supplied to a high gain trans-admittance amplifier comprising current source 461, transistor 462 and resistor 464. Finally, the output of the resistor 446 and the capacitor 447 is supplied to a high gain trans-admittance amplifier comprising current source 466, transistor 467 and resistor 468. In an embodiment, the downconverter 200 and the high gain trans-admittance amplifier 450 can operate from a 1.2V regulated supply.

The output of the high gain trans-admittance amplifier 450 is provided to an RC lowpass filter 470. The RC lowpass filter 470 comprises resistor 471, capacitor 472 and resistor 474. The RC lowpass filter 470 also comprises resistor 476, capacitor 477, and resistor 478.

The output of the RC lowpass filter 470 is provided to a filter 480, comprising amplifier 481 and related resistors (R1 and R2) and capacitors (C1 and C2), and amplifier 491 and related resistors (R1 and R2) and capacitors (C1 and C2). The filters 470 and 480 are not completely independent and affect each other due to loading at their interface. The composite characteristics of the filters 470 and 480 can be adjusted using resistors 471, 476, capacitors 472 and 477, resistor R1, resistor R2, capacitor C1 and capacitor C2 to obtain a desired filter response. The overall receiver gain can be scaled using resistors 456, 459, 464 and 468 or adjusting resistors 471 and 476, capacitors 472 and 477, resistor R1, resistor R2, capacitor C1 and capacitor C2. The concept is not limited to the use of the particular active filter topology shown; other topologies may be used including other op-amp-based active filter topologies as well as passive RC filters.

The output voltage of the filter 480 is provided to an analog-to-digital converter (ADC) 490. The output voltage of the amplifier 481 is provided to the ADC 492, and the output voltage of the amplifier 491 is provided to the ADC 494. The digital output of the ADC 490 is provided to the baseband subsystem 130.

FIG. 5 is a graphical illustration 500 showing an example frequency spectrum within which the low noise receiver operates. The abscissa 502 represents frequency and the ordinate 504 represents signal level. The region 506 illustrates the receive frequency range from 925 MHz to 960 MHz. The region 506 also illustrates the filter region that would be provided by a SAW filter if a SAW filter were present in the system. The signal 508 represents the desired signal and the region 512 depicts a 2 MHz wide frequency response covering region 518, centered at the desired receive frequency (tuning frequency 516) that is provided by the operation of the downconverter 200. In an embodiment, the downconverter 200 can be referred to as a "filtering mixer."

An out-of-band blocking signal, also referred to as an out-of-band interfering signal, is depicted in FIG. 5 using reference numeral 522. In this example, the out-of-band blocking signal 522 is approximately 20 MHz higher in frequency than the upper frequency range of 960 MHz. The downconverter 200 exhibits the frequency response 512, thereby passing signals within frequency range 518, and substantially rejecting signals outside frequency range 518, thereby preventing out-of-band blocking signals from interfering with the desired signal 508. The frequency response 512 is a band pass response with very high Q around the tuning frequency 516 (the frequency of the LO ($f_{LO}$)) having a 3 dB bandwidth of 2 MHz centered at the tuning frequency 516. This high Q band pass response is established by the low pass pole due to capacitor 438 and resistor 437 of FIG. 4 (for example, $C_L$ and $R_B$) being effectively reflected through the transistors in the downconverter 200 to present a band pass pole centered on the LO frequency at the downconverter input. For higher offsets around LO, a 20 dB/decade drop in input impedance is observed, until the response reaches a floor that is determined by the finite on resistance of the passive switches used in the downconverter 200. By means of this high Q filter at the downconverter input, a 20 MHz blocker in the GSM 950 MHz band is attenuated by more than 12 dB.

As the local oscillator frequency applied to the downconverter 200 of FIG. 4 changes, the 2 MHz wide region 512 will shift with the tuning frequency 516. Any channel to which the receiver 400 is tuned will have this 2 MHz wide filter region around the tuning frequency 516, thus eliminating any out-of-band (beyond 2 MHz) blocking signals. This eliminates the need for the SAW filter at the input to the low noise receiver 400.

This 'tracking filter" operation together with the low noise provided by the downconverter 200 allows the elimination of a low noise amplifier, as shown in FIG. 4 where the front end module 144 is connected directly to the low pass filter 410 at the input to the downconverter 200. The 25% duty cycle LO, derived by the LO 2LO method described in FIG. 3, applied to the downconverter 200, providing non-overlapping downconverter phases as shown in FIG. 3, allows approximately 6 dB voltage gain to be provided by the downconverter 200, thus further justifying the omission of a low noise amplifier between the front end module 144 and the low pass filter 410.

However, if the out-of-band blocking signal 522 occurs at a frequency that is either three or five times the tuning frequency 516 of the desired signal 508 (commonly referred to as the third or fifth harmonic of the fundamental frequency), then, through a phenomenon referred to as mixer aliasing, the full amplitude of the out-of-band blocking signal 522 would be superimposed over the desired signal 508, thus degrading receiver sensitivity at the tuning frequency 516.

In order to prevent an out-of-band blocking signal 522 that may occur at an odd harmonic, for example, the third or fifth harmonic, of the desired signal 508 from interfering with the desired signal 508, the low pass filter 410 (FIG. 4) is implemented to reduce receiver sensitivity at the third and fifth harmonic frequency of the desired signal 508. The total number of matching components used in the low pass filter 410 is less than or equal to that used in typical quad-band receiver matching circuits. A simple fourth order filter provides more than 30 dB rejection for the unwanted components at three or five times the desired receive frequency. By appropriate choice of components, this rejection can be increased to more than 65 dB by the utilization of component self-resonances.

Further, as will be described below in FIG. 7, taking advantage of the output phases available from the downconverter 200, the phases can be summed in order to further attenuate out-of-band blocking signals occurring predominately at odd harmonics, for example, at the third and fifth harmonics, of the desired signal.

Figure 6:
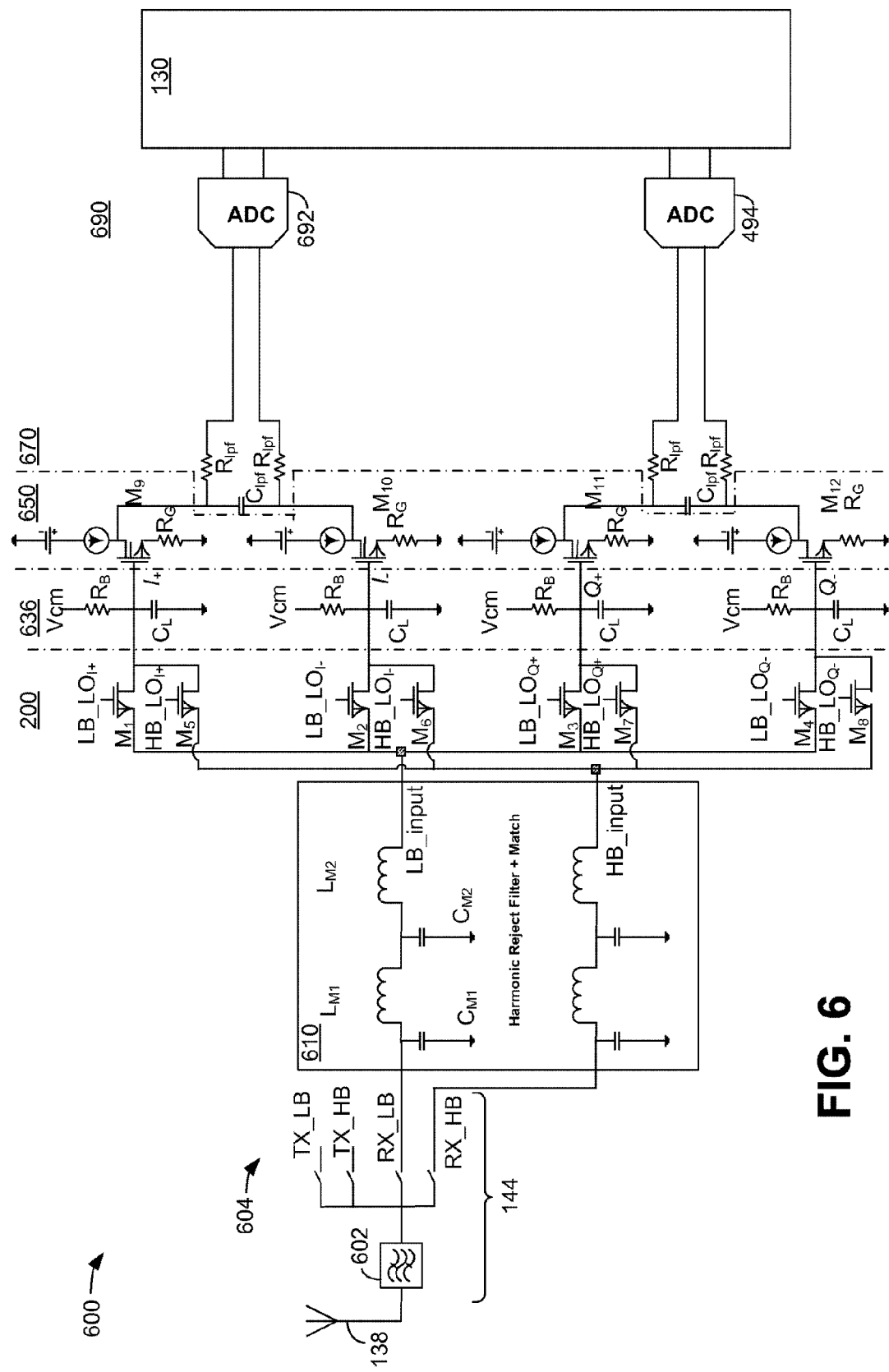
FIG. 6 is a schematic diagram illustrating an alternative embodiment of the low noise receiver of FIG. 4.

FIG. 6 is a schematic diagram illustrating an alternative embodiment of the low noise receiver of FIG. 4. Elements in FIG. 6 that are similar to elements in FIG. 4 will be numbered using the convention 6XX, where the "XX" in FIG. 6 refers to a similar element in FIG. 4. Further, some of the reference numerals in FIG. 6 are not shown for simplicity. The low noise receiver 600 is similar to the low noise receiver 400, except that the embodiment of FIG. 6 shows an exemplary baseband filter implementation where the output current from the baseband V-I conversion stage provided by a high gain trans-admittance amplifier 650 is applied directly to the virtual ground of a continuous time ADC 690, comprising ADC elements 692 and 694, after passive low pass filtering in the RC lowpass filter 670.

Figure 7:
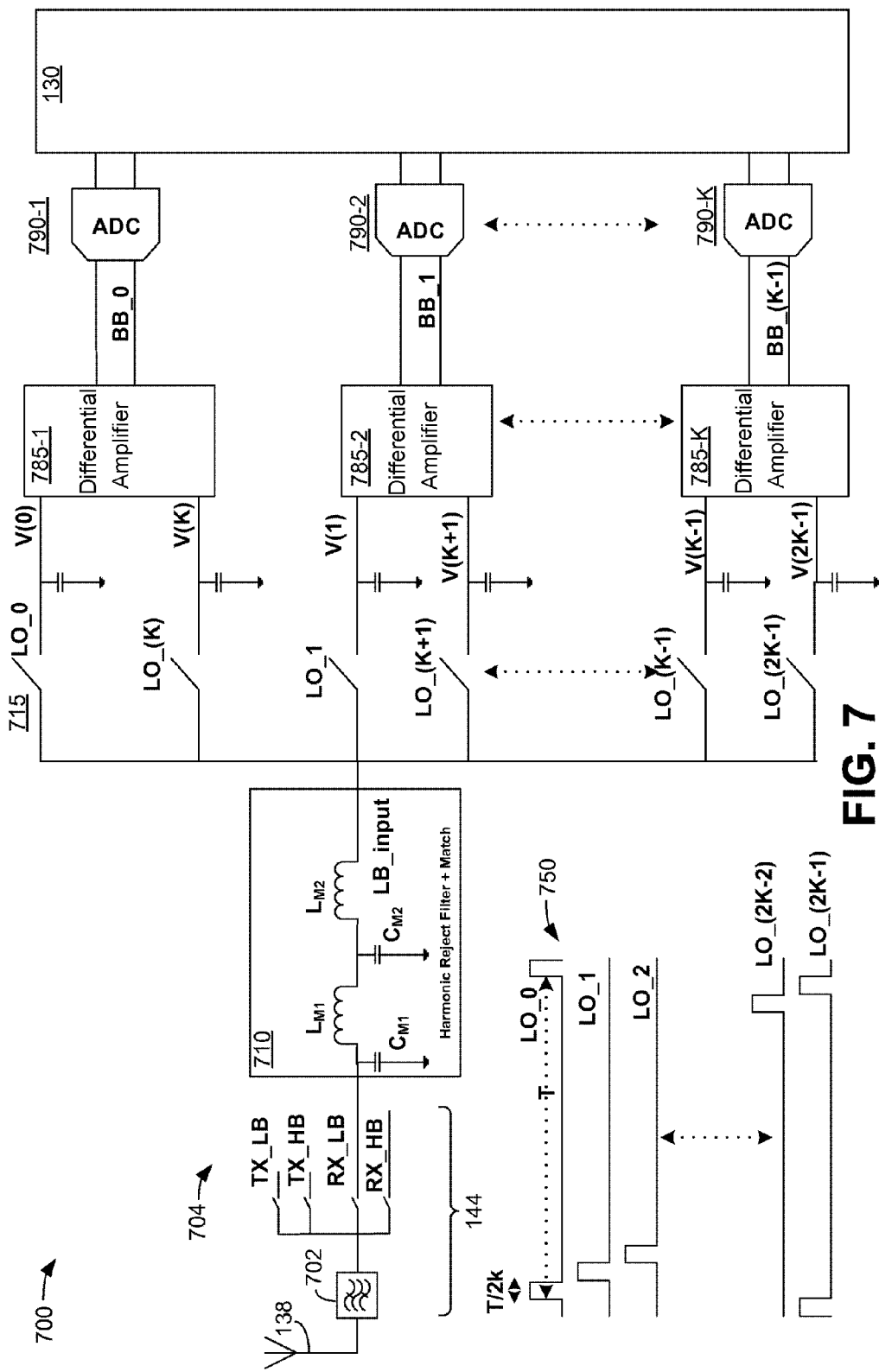
FIG. 7 is a schematic diagram illustrating another alternative embodiment of the low noise receiver of FIG. 4.

FIG. 7 is a schematic diagram illustrating another alternative embodiment of the low noise receiver of FIG. 4. The embodiment of the low noise receiver of FIG. 7 illustrates only one band (the low band) and shows an example of generating eight (8) output phases of the downconverter 200. Additional attenuation of out-of-band blocking signals that may occur at odd harmonics, for example at the third and fifth harmonics of the desired receive frequency, can be obtained by taking advantage of the output phases available from the downconverter 200. The output phases from the downconverter 200 can be summed in order to further attenuate out-of-band blocking signals at, for example, the third and fifth harmonics of the desired signal.

The embodiment of the low noise receiver 700 illustrates only the low band for simplicity of illustration. The low noise receiver 700 includes an implementation of a downconverter 200 shown using simple switches instead of transistor devices and illustrates only the low band (LB) signal chain for simplicity. The LO drive signals for the switches are shown using the graphical illustration 750. The embodiment of the downconverter 715 includes 2K taps, taking a total of 2K samples per complete cycle of the LO frequency. In a general 2K tap downconverter 715, the duty cycle of each LO waveform is less than LO/2K. The gain of the downconverter 715 approaches 0 dB as K increases. For the case of a single-ended downconverter, the gain approaches 6 dB from the combination of single-ended to differential conversion and the sample and hold (S/H) operation described above. Any voltage step-up in the low pass filter module 710 provides additional gain, as discussed above.

The 2K tap implementation where K is 4, 8, 16, etc., allows configurations where harmonics of the input RF frequency can be rejected by simple weighted summation of the outputs of the downconverter 715. An example of the summation of three output phases that provide a waveform that carries no third or fifth harmonics is described in FIG. 8.

The signal from the low pass filter module 710 is provided to downconverter 715 which is shown for simplicity as an array of switches. Each switch is shown with the designation of the LO waveform 750 that drives it (LO_0 through LO_(2K−1)). In the general implementation shown in FIG. 7, 2K switches (LO_0 through LO_(2K−1)) are used in the signal path, each switch having a duty cycle≤(100/2K) %. The period of the LO frequency is T, and each LO waveform exhibits an active pulse width of T/2K. The implementation discussed in this example is a specific case for K=4, so each LO waveform 750 exhibits an active pulse width of T/8. However, any number K of baseband outputs could be used in receiver topologies depending on application. As the number K increases, the sample-and-hold gain approaches 0 dB. For example, a $3^{rd}$ and $5^{th}$ harmonic rejection receiver architecture might use K=4 to generate the 0, 45, 90, 135, 180, 225, 270 and 315 degree samples of the RF waveform. The outputs denoted by V(0), V(1), . . . V(2K−1) in FIG. 7, for the case of K=4, correspond to the 0, 45, 90, 135, 180, 225, 270 and 315 degree samples, respectively. The outputs V(0), V(1), . . . V(2K−1) are grouped in pairs where each pair comprises outputs differing in phase by 180 degrees. For instance, the difference of V(0) and V(K), the difference of V(1) and V(K+1), and the difference of V(K−1) and V(2K−1). The difference of each of these pairs is then determined by a respective difference amplifier 785-1 through 785-K. Difference amplifiers 785-1 through 785-K may also include low pass filters, as described in FIG. 4 as filters 480. Since the signals being differenced are 180 degrees out of phase, 6 dB gain is achieved. In the specific case for K=4, the resulting outputs of difference amplifiers 785-1 through 785-K represent gain-added phases of the received signal at 0, 45, 90, and 135 degrees with the added 6 dB gain. The outputs of difference amplifiers 785-1 through 785-K are applied to ADCs 790-1 through 790-K. Outputs of ADCs 790-1 through 790-K are then applied to baseband system 130. Within baseband system 130, harmonic rejection summing can be implemented using weighted summations of these multiple phases, as will be described below.

The technique shown in FIG. 7 is an effective way of splitting the RF signal in the time domain into K separate paths without adding extra circuit blocks that could severely degrade performance or increase power consumption and die area.

Figure 8:
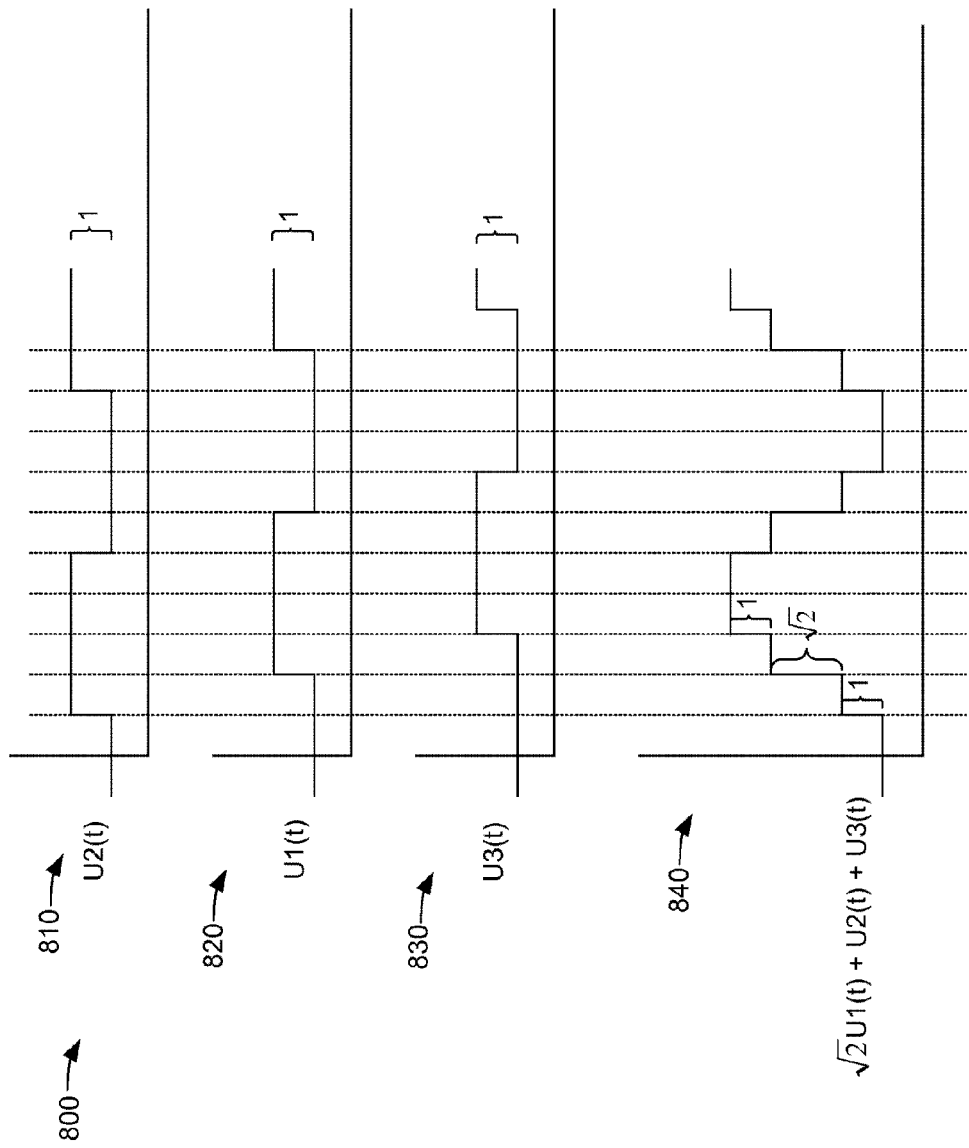
FIG. 8 illustrates a method of generating a waveform in which $3^{rd}$ and $5^{th}$ harmonics are rejected.

FIG. 8 illustrates a known method of generating a waveform in which $3^{rd}$ and $5^{th}$ harmonics are rejected. FIG. 8 shows only the signals relating to the in-phase (I) signal. For simplicity, the example in FIG. 8 shows an example of the summation of three output phases that provide a waveform that carries no third or fifth harmonics. Other numbers of output phases can be combined to achieve a similar output waveform.

The waveform 820 represents the fundamental LO signal according to the equation:

$$U1(t) = \frac{2}{\pi}[(\cos(\omega t) - 1/3(\cos(3\omega t) + 1/5(\cos(5\omega t)...]$$

The waveform 810 represents the fundamental LO signal 820 advanced 45 degrees relative to the signal 820. Signal 810 is represented according to the equation:

$$U2(t) = \frac{\sqrt{2}}{\pi}[(\cos(\omega t) - \sin(\omega t)) +$$

$$1/3(\cos(3\omega t) + \sin(3\omega t)) - 1/5(\cos(5\omega t) - \sin(5\omega t))...]$$

The waveform 830 represents the fundamental LO signal 820 retarded by 45 degrees relative to signal 820. Signal 830 is represented according to the equation:

$$U3(t) = \frac{\sqrt{2}}{\pi}[(\cos(\omega t) + \sin(\omega t)) +$$

$$1/3(\cos(3\omega t) - \sin(3\omega t)) - 1/5(\cos(5\omega t) + \sin(5\omega t))...]$$

The waveform 840 represents the combination of the above three waveforms in the appropriate proportions such that the third and fifth harmonics of the fundamental LO signal 820 are rejected. The combination is formed according to the equation:

$$LO\_harm\_rej(t) = \sqrt{2}U1(t) + U2(t) + U3(t)$$

Returning now to FIG. 7, the effective LO outputs of the downconverter 715 can be combined as generally described above with respect to FIG. 8, and as will be described below in FIG. 10 for the case of eight output phases, to provide additional harmonic rejection, which further simplifies the requirements for the low pass filter 410 (FIG. 4). For K=4, a downconverter configuration is obtained that provides third and fifth harmonic rejection, allowing the receiver to reject input signals at three times and five times the desired RF signal.

Figure 9:
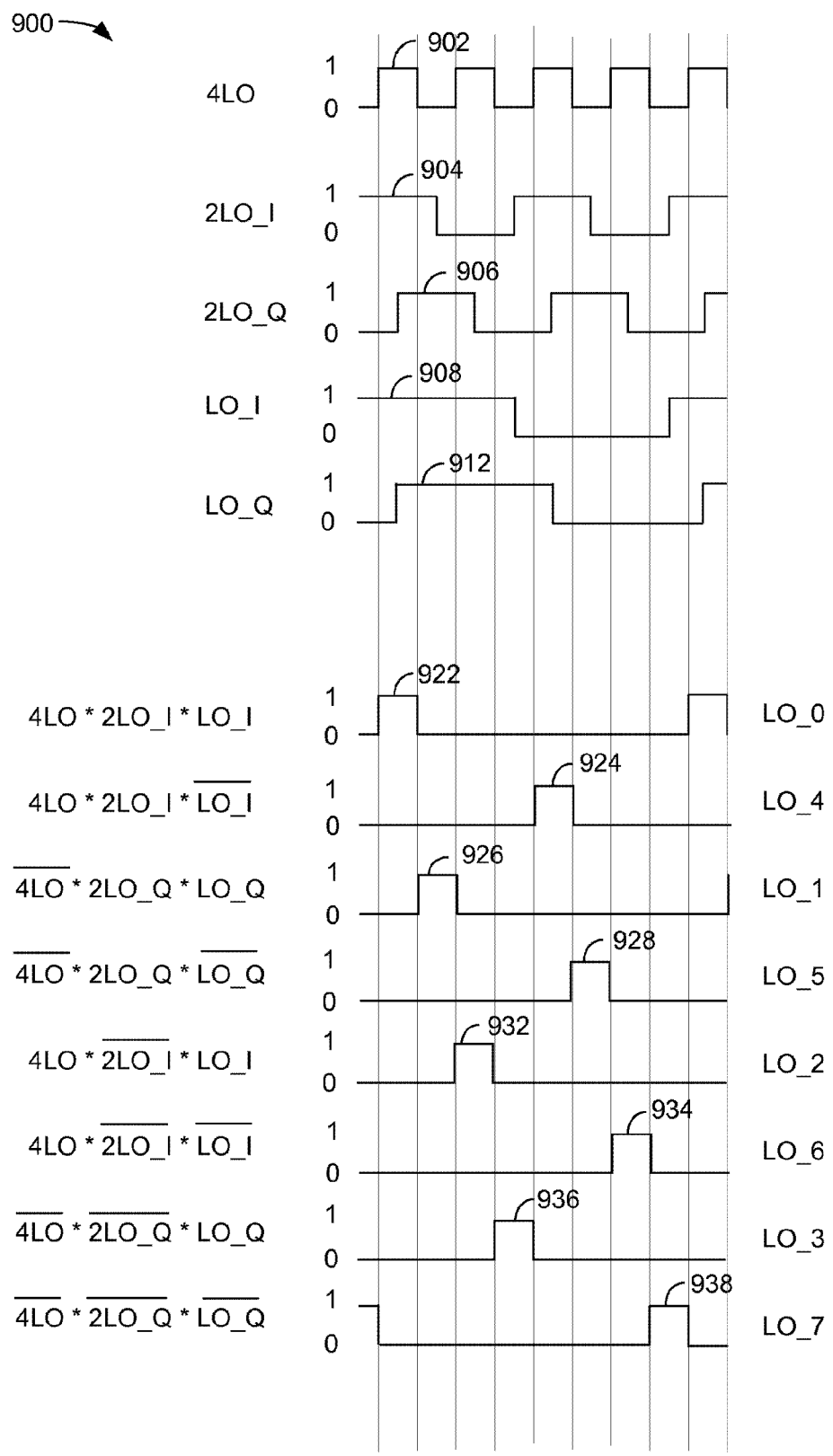
FIG. 9 is a graphical illustration showing the derivation of the eight LO phases utilized by the low noise receiver of FIG. 7 for the case of k=4.

FIG. 9 is a graphical illustration showing the eight LO phases utilized by the low noise receiver of FIG. 7 for the case of K=4. The trace 902 shows a 4LO waveform with 50% duty cycle. The traces 904 and 906 show two quadrature phases of 2LO, respectively referred to as 2LO_I and 2LO_Q. The traces 908 and 912 show two 45 degree offset phases of LO, respectively referred to as LO_I and LO_Q. The signals represented by the traces 902, 904, 906, 908 and 912 are multiplied in the eight combinations shown by traces 922, 924, 926, 928, 932, 934, 936 and 938 to produce eight respective LO waveforms, referred to as LO_0, LO_4, LO_1, LO_5, LO_2, LO_6, LO_3 and LO_7, each of which exhibits a ⅛ duty cycle.

Figure 10:
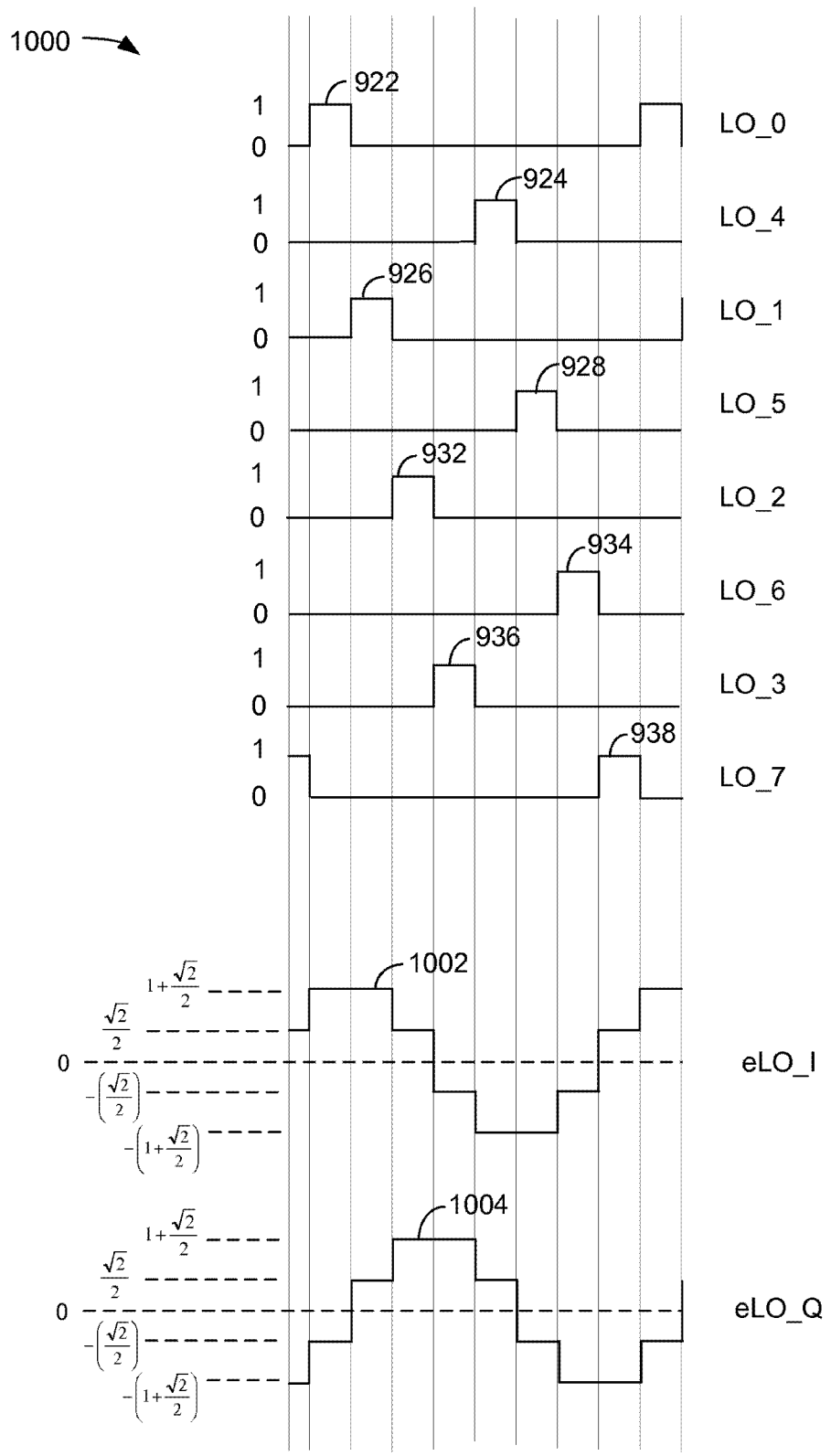
FIG. 10 is a graphical illustration showing the effective quadrature LO waveforms, each with $3^{rd}$ and $5^{th}$ harmonics rejected, that are generated by weighted combining of the eight LO phases utilized by the low noise receiver of FIG. 7 for the case of K=4.

FIG. 10 is a graphical illustration showing the effective quadrature LO waveforms, each with $3^{rd}$ and $5^{th}$ harmonics rejected, that are generated by weighted combining of the eight LO phases utilized by the low noise receiver of FIG. 7 for the case of k=4.

Figure 11:
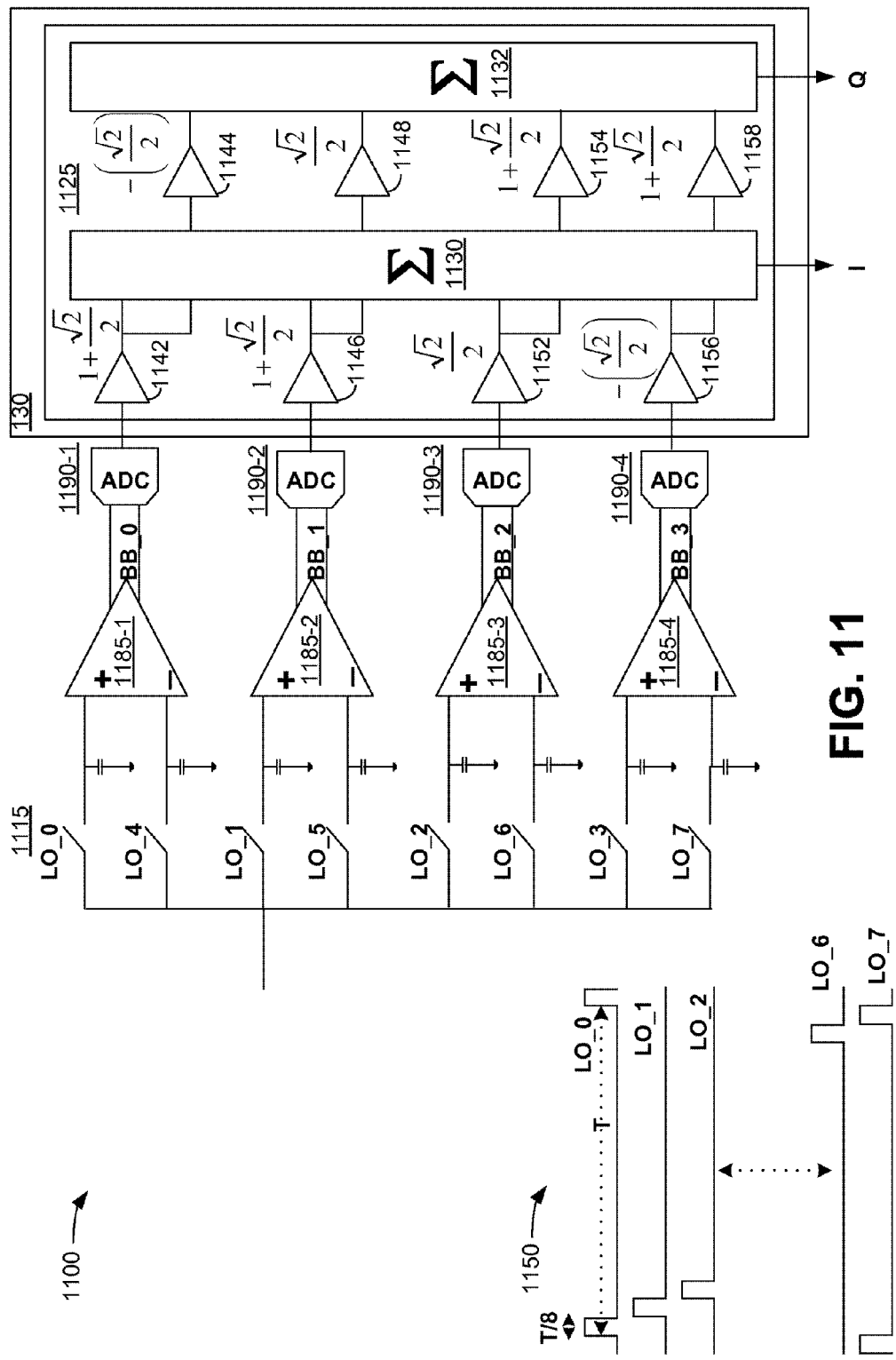
FIG. 11 is a schematic diagram illustrating an embodiment of a low noise receiver that implements the effective quadrature LO waveforms of FIG. 10.
Figure 13:
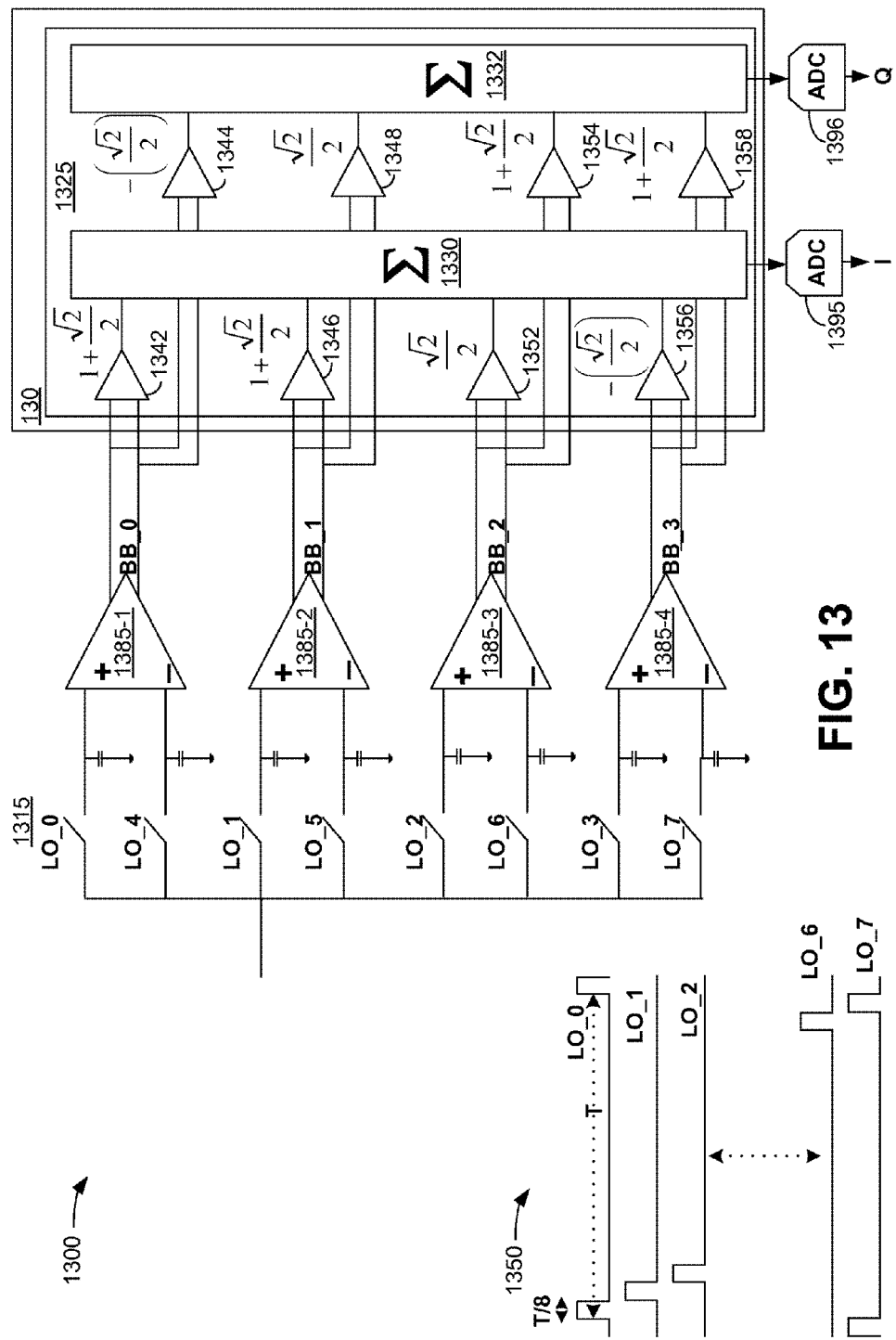
FIG. 13 is a schematic diagram illustrating an alternative embodiment of the low noise receiver of FIG. 11.

In FIG. 10, the eight ⅛-duty-cucle waveforms LO_0 through LO_7, shown respectively by traces 922, 924, 926, 928, 932, 934, 936 and 938 are combined in the baseband subsystem 130 in the appropriate proportions to form effective quadrature waveforms eLO_I 1002 and eLO_Q 1004, as will be further illustrated in FIG. 11 and FIG. 13. The waveforms eLO_I 1002 and eLO_Q 1004 exhibit the same harmonic-rejecting characteristic shape for a signal having eight combined output phases as that shown by trace 840 in FIG. 8 for a combination of three output phases.

Suppression of harmonics greater than the fifth harmonic can be achieved by increasing the number of output phases. For example, using 16 output phases and the proper choice of weighting coefficients, a frequency response suppressing the 3rd, 5th, 7th, 9th, 11th, and 13th, harmonics could be achieved. Such a response would look similar to the plot 1220 (FIG. 12), extended out to 16 GHz, with big lobes only at 1 GHz and 15 GHz. In such a case the waveforms eLO_I and eLO_Q would exhibit a finer-toothed quantization compared to the plots 1002 and 1004 in FIG. 10. As the number of output phases further increases toward infinity, eLO_I and eLO_Q would become pure sine waves, which contain no harmonics at all.

FIG. 11 is a schematic diagram illustrating an embodiment of a low noise receiver that implements the effective quadrature LO waveforms of FIG. 10. The low noise receiver 1100 is an alternative embodiment of the low noise receiver 700 of FIG. 7 and combines the effective quadrature LO waveforms of FIG. 10 to provide additional rejection of 3rd and $5^{th}$ harmonics at the input of the downconverter. The switches that comprise the downconverter 1115 are controlled by the 8 LO phases shown by traces 922, 924, 926, 928, 932, 934, 936 and 938 in FIG. 9. The embodiment shown in FIG. 11 includes 8 phases of the LO signal, and as such, the 8 LO signals are represented as LO_0 through LO_7, as shown in the graphical illustration 1150.

Combining the eight LO phases to provide additional rejection of the $3^{rd}$ and $5^{th}$ harmonics occurs in two parts. The first combining of the 8 LO phases occurs in the analog domain using analog difference amplifiers 1185-1, 1185-2, 1185-3 and 1185-4. Every nth sample of the received signal is differenced with the (n+4)th sample by the respective analog difference amplifiers 1185. The LO_0 signal is combined with the LO_4 signal by the analog difference amplifier 1185-1. The LO_1 signal is combined with the LO_5 signal by the analog difference amplifier 1185-2. The LO_2 signal is combined with the LO_6 signal by the analog difference amplifier 1185-3. The LO_3 signal is combined with the LO_7 signal by the analog difference amplifier 1185-4. The respective outputs of the analog difference amplifiers 1185-1 through 1185-4 represent phases of the received signal at 0, 45, 90 and 135 degrees with an approximate 6 dB added gain, as described above in FIG. 7.

The outputs of the analog difference amplifiers 1185 are converted to the digital domain by respective ADC elements 1190. The output of the analog difference amplifier 1185-1 is supplied to the ADC 1190-1. The output of the analog difference amplifier 1185-2 is supplied to the ADC 1190-2. The output of the analog difference amplifier 1185-3 is supplied to the ADC 1190-3. The output of the analog difference amplifier 1185-4 is supplied to the ADC 1190-4.

The second combining of the eight LO phases occurs in the digital domain using a digital summation harmonic reject filter 1125, which can be implemented in hardware, software, or a combination of hardware and software. In an embodiment, the digital summation harmonic reject filter 1125 is part of the operation of the receiver software 155 and is executed by the processor 135. The receiver software 155 performs a summation represented by summation elements 1130 and 1132. The output of the ADC 1190-1 is provided to multiplying element 1142 and to the multiplying element 1144. The output of the ADC 1190-2 is provided to multiplying element 1146 and to the multiplying element 1148. The output of the ADC 1190-3 is provided to multiplying element 1152 and to the multiplying element 1154. The output of the ADC 1190-4 is provided to multiplying element 1156 and to the multiplying element 1158. Each multiplying element digitally amplifies the signal passing though it by its respective weighting factor shown in FIG. 11. For example, the output of ADC 1190-1 is digitally amplified by multiplying element 1142 by a factor of 1+ $\sqrt{2}/2$. The summation of the weighted signals is performed in the summation elements 1130 and 1132, resulting in baseband outputs I and Q. Importantly, the switches in the downconverter 1115 do not interfere with one another due to the non-overlapping LO signals that drive them. Further, the summation performed by the summation elements 1130 and 1132 is done at baseband, but has the effect of rejecting harmonics, particularly $3^{rd}$ and $5^{th}$ harmonics, at RF. Therefore the baseband outputs I and Q represent a faithful reproduction of the baseband signals carried on the desired RF carrier to which the receiver is tuned, without any substantial interference due to the presence of undesired RF blocking signals that may exist at the $3^{rd}$ and $5^{th}$ harmonics of the desired RF carrier.

Figure 12:
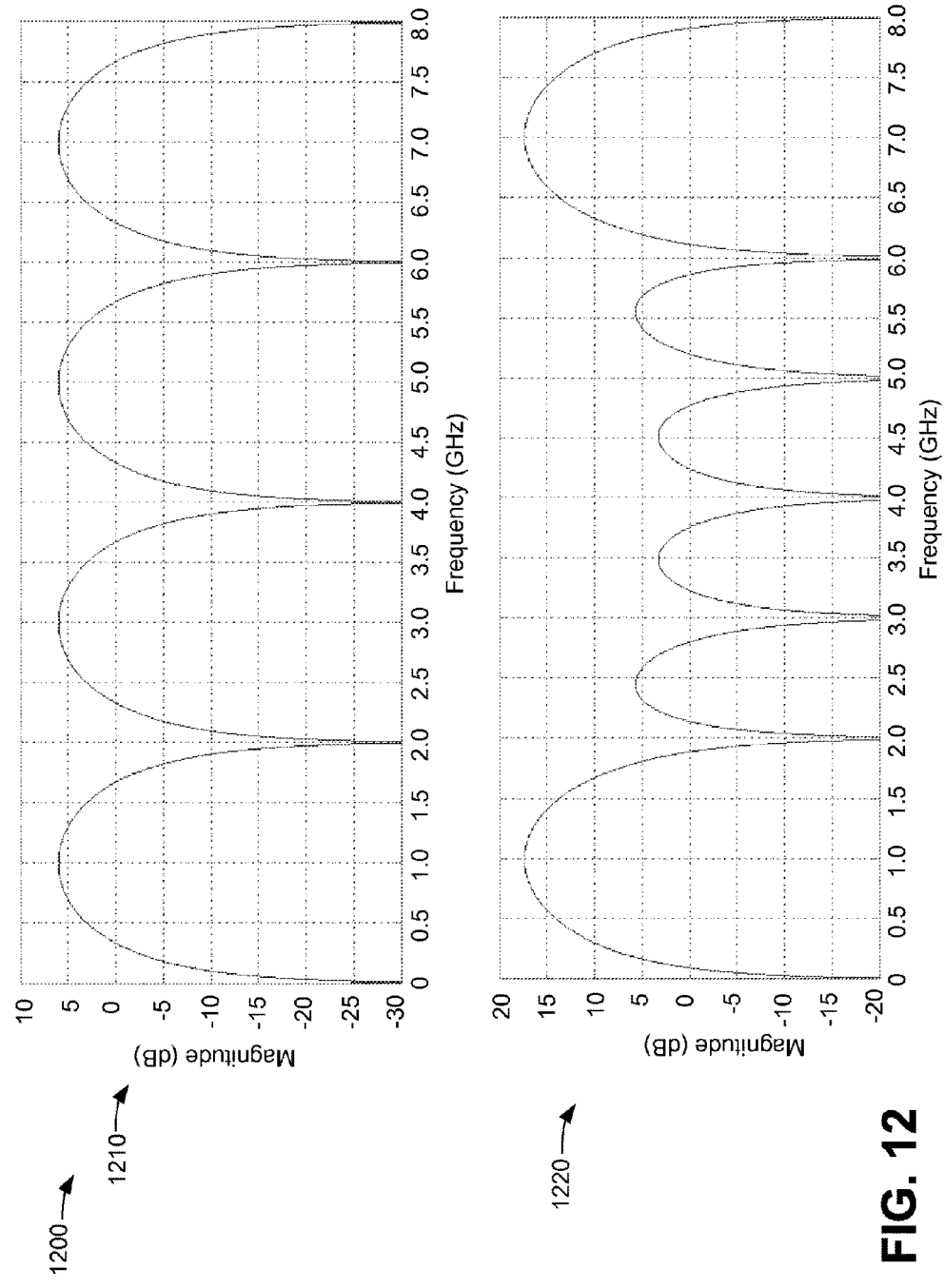
FIG. 12 is a graphical illustration showing an example of the frequency response of embodiments of the low noise receiver.

FIG. 12 is a graphical illustration showing an example of the frequency response of embodiments of the low noise receiver. The example in FIG. 12 shows the response for a 1 GHz receive signal. The plot 1210 illustrates the effective response of the switching and summing actions of downconverter 200 of FIG. 4, for which K=2. Plot 1210 does not include the effect of LC harmonic rejection filter 410. In plot 1210 the even harmonics are rejected but the odd harmonics remain. Thus, the LC harmonic rejection filter 410 in FIG. 4 must provide all the attenuation of the $3^{rd}$, $5^{th}$, and $7^{th}$ harmonics.

The plot 1220 illustrates the effective response of the switching and summing actions of the low noise receiver 1100 of FIG. 11, for which K=4. Plot 1220 does not include the effect of any LC antenna filter. In this case, the $3^{rd}$ and $5^{th}$ harmonics are greatly rejected due to the 8-phase switching and the harmonic-rejection summation, leaving only the $7^{th}$ harmonic. Thus, when an LC antenna filter is added to the system of FIG. 11 such LC antenna filter need only reject the $7^{th}$ harmonic, which is far easier than rejecting the $3^{rd}$ and $5^{th}$ harmonics as described above.

FIG. 13 is a schematic diagram illustrating an alternative embodiment of the low noise receiver of FIG. 11. The embodiment 1300 shown in FIG. 13 shows analog summation of the LO signals, LO_0 through LO_7 described in FIG. 10 for the case of K=4. The switches that comprise the downconverter 1315 are controlled by the 8 LO phases shown by traces 922, 924, 926, 928, 932, 934, 936 and 938 in FIG. 9. The embodiment shown in FIG. 13 includes 8 phases of the LO signal, and as such, the 8 LO signals are represented as LO_0 through LO_7, as shown in the graphical illustration 1350.

Combining the eight LO phases occurs in two parts. The first combining of the 8 LO phases occurs in the analog domain using analog difference amplifiers 1385-1, 1385-2, 1385-3 and 1385-4. Every nth sample of the received signal is differenced with the (n+4)th sample by the analog difference amplifiers 1385. The LO_0 signal is combined with the LO_4 signal by the analog difference amplifier 1385-1. The LO_1 signal is combined with the LO_5 signal by the analog difference amplifier 1385-2. The LO_2 signal is combined with the LO_6 signal by the analog difference amplifier 1385-3. The LO_3 signal is combined with the LO_7 signal by the analog difference amplifier 1385-4.

In this embodiment, the second combining of the eight LO phases also occurs in the analog domain in an analog summation reject filter 1325. The filter 1325 performs a summation using summation elements 1330 and 1332. The output of the analog difference amplifier 1385-1 is provided to amplifier 1342 and to the amplifier 1344. The output of the analog difference amplifier 1385-2 is provided to amplifier 1346 and to the amplifier 1348. The output of the analog difference amplifier 1385-3 is provided to amplifier 1352 and to the amplifier 1354. The output of the analog difference amplifier 1385-4 is provided to amplifier 1356 and to the amplifier 1358. Each amplifier 1342, 1344, 1346, 1348, 1352, 1354, 1356 and 1358 amplifies the signal passing though it by its respective weighting factor shown in FIG. 13. For example, the output of analog difference amplifier 1385-1 is amplified by amplifier 1342 by a factor of $1+\sqrt{2}/2$. The summation of the weighted signals is performed in the summation elements 1330 and 1332, resulting in analog I and Q signals. Importantly, the switches in the downconverter 1315 do not interfere with one another due to the non-overlapping LO signals that drive them.

Further, the summation performed by the summation elements 1330 and 1332 is done at baseband, but has the effect of rejection of harmonics at RF. Therefore the baseband outputs I and Q represent a faithful reproduction of the baseband signals carried on the desired RF carrier to which the receiver is tuned, without any substantial interference due to the presence of undesired RF blocking signals that may exist at the $3^{rd}$ and $5^{th}$ harmonics of said desired RF carrier.

The in-phase output of the summing element 1330 is provided to an ADC 1395 for conversion to the digital domain. The quadrature-phase output of the summing element 1332 is provided to an ADC 1396 for conversion to the digital domain. The digital in-phase signal and the digital quadrature-phase signal are then provided to the baseband subsystem 130 (FIG. 1) for further processing.

Typical rejection for harmonics of the desired signal frequency, with harmonic rejection summation performed in the analog domain as shown in FIG. 13, is limited to approximately 35 dB to 40 dB, due to analog component tolerances, while the digital implementation shown in FIG. and FIG. 11 can achieve greater than 40 dB rejection since the only analog tolerances remaining in the implementation of FIG. 11 are those of the sampling capacitors, difference amplifiers and ADCs. Proportional summation in the digital domain, as shown in FIG. 11 potentially allows for implementation of least mean squares (LMS) based algorithms that can maximize the rejection at n times the desired signal by further compensating for any analog mismatches in the various paths.

Figure 14A:
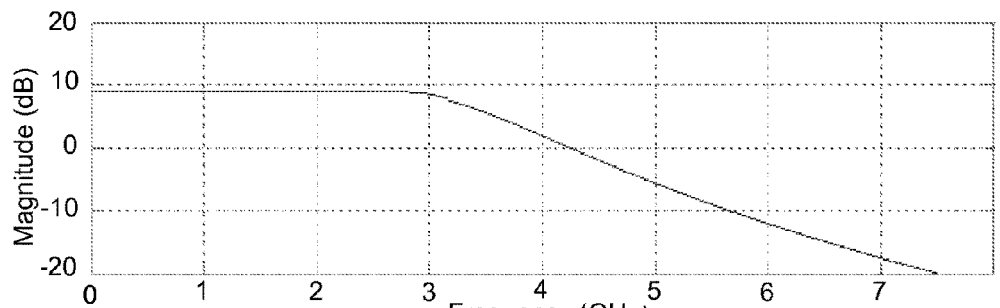
FIGS. 14A through 14D are graphical illustrations showing an example frequency response of an embodiment of the low noise receiver of FIG. 4 at a receive frequency of 1 GHz.
Figure 14B:
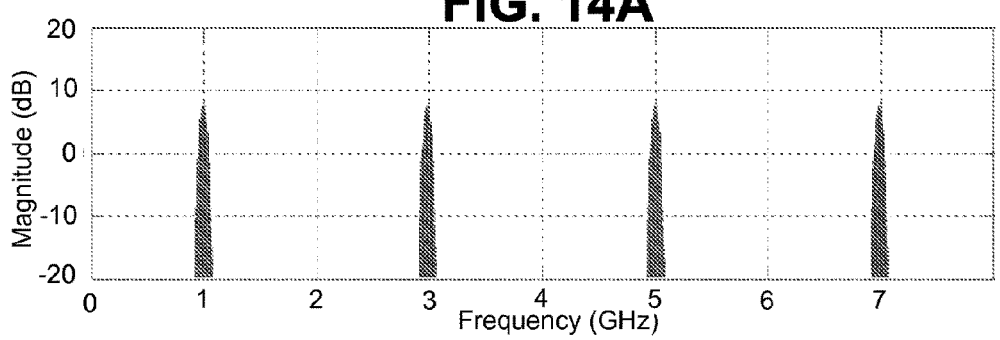
Figure 14C:
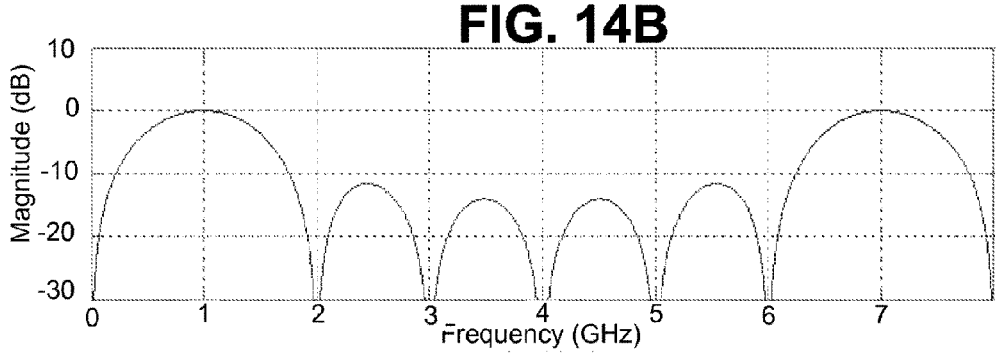
Figure 14D:
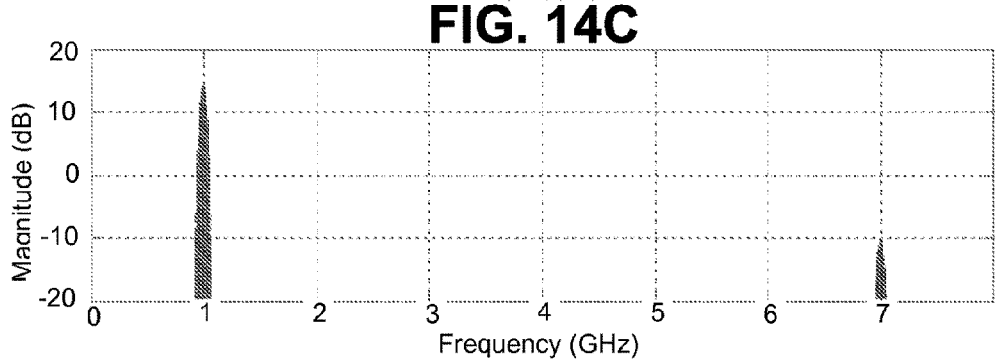

FIGS. 14A through 14D are graphical illustrations showing an example frequency response of an embodiment of the low noise receiver of FIG. 11 or FIG. 13, with the addition of a low pass filter module between the antenna and the input to the downconverter, operating with a receive frequency of 1 GHz. FIG. 14A illustrates an example response of a $4^{th}$-order low pass filter module 410. In this example the filter is designed with a wide bandwidth and gentle slope, as it is required to provide rejection only at the $7^{th}$ harmonic, and not the $3^{rd}$ or $5^{th}$ harmonic. FIG. 14B shows the 2 MHz-wide passband at 1 GHz (caused by the switching and the RC), plus all the unwanted similar responses that occur at harmonics due to aliasing. FIG. 14C shows the response formed by the harmonic-rejection summation of FIG. 11 or FIG. 13. FIG. 14D shows the cascaded response of FIGS. 14A, 14B and 14C. In the cascaded response of FIG. 14D is shown the desirable characteristics of the 2 MHz-wide response that tracks the receiver's tuned frequency, with similar responses rejected at the $3^{rd}$ and $5^{th}$ harmonics, and substantially suppressed at the $7^{th}$ harmonic.

While various embodiments of the invention have been described, it will be apparent to those of ordinary skill in the art that many more embodiments and implementations are possible that are within the scope of the invention. For example, the invention is not limited to a specific type of radio receiver or transceiver. Embodiments of the invention are applicable to different types of radio receivers and transceivers and are applicable to any receiver that downconverts or filters a received signal.

What is claimed is:

1. A receiver, comprising:
   filtering circuitry configured to perform low pass filtering and gain functions on a radio frequency signal provided by switch circuitry to generate a filtered radio frequency signal;
   a downconverter configured to generate a plurality of output phases based on the filtered radio frequency signal and a respective plurality of local oscillator signals, the plurality of output phases organized into at least K groups where K is an integer of four or greater, and each nth group of the K groups includes nth and (n+K)th output phases of the plurality of output phases, where n is an integer between 0–(K–1); and
   a differencing stage configured to difference the nth output phase of each respective group of the K groups with the (n+K)th output phase of the respective group, resulting in gain-added output phases.

2. The receiver of claim 1 wherein the filtering circuitry includes an impedance matching circuit.

3. The receiver of claim 2 wherein the impedance matching circuit provides impedance matching from the switch module to an input of the downconverter.

4. The receiver of claim 2 wherein the impedance matching circuit provides a step up in voltage of the radio frequency signal.

5. The receiver of claim 4 wherein the step up in voltage is by a factor of the square root of the ratio of an input impedance of the filtering circuitry to an input impedance at the input to the downconverter.

6. The receiver of claim 1 wherein K is a power of 2.

7. The receiver of claim 1 wherein K is 4, 8, or 16.

8. The receiver of claim 1 wherein K is a multiple of four.

9. The receiver of claim 1 wherein K is an even number.

10. The receiver of claim 1 wherein the receiver does not include a low noise amplifier for amplifying the radio frequency signal.

11. The receiver of claim 10 wherein the receiver does not include a surface acoustic wave filter for filtering the radio frequency signal.

12. The receiver of claim 1 further comprising a summation filter configured to combine the gain-added output phases such that a response of the receiver effectively reduces odd harmonics of the radio frequency signal.

13. The receiver of claim 1 wherein the downconverter generates eight output phases.

14. The receiver of claim 1 wherein the downconverter provides a gain of at least approximately 6 decibels.

15. A wireless communication device comprising the receiver of claim 1.

16. A method in a receiver for processing a received radio frequency signal, comprising:
   using filtering circuitry, performing low pass filtering and gain functions on the received radio frequency signal provided by switch circuitry, thereby generating a filtered radio frequency signal;

downconverting the filtered radio frequency signal, said downconverting including generating a plurality of output phases based on the filtered radio frequency signal and a respective plurality of local oscillator signals, the plurality of output phases organized into at least K groups where K is an integer of four or greater, each nth group of the K groups including nth and (n+K)th output phases of the plurality of output phases, where n is an integer between $0-(K-1)$; and differencing the nth output phase of each respective group of the K groups with the (n+K)th output phase of the respective group, resulting in gain-added output phases.

17. The method of claim 16 wherein the filtering circuitry includes an impedance matching circuit configured to match an impedance at an input to the filtering circuitry with an impedance at an input of the downconverter.

18. The method of claim 17 wherein the impedance matching circuit provides a voltage gain to the radio frequency signal.

19. The method of claim 16 wherein K is a power of 2.

20. The method of claim 16 wherein K is 4, 8, or 16.

21. The method of claim 16 wherein K is a multiple of four.

22. The method of claim 16 wherein the receiver does not include a low noise amplifier.

23. The method of claim 16 wherein the receiver does not include a surface acoustic wave filter.

24. The method of claim 16 further comprising combining the gain-added output phases such that a response of the receiver effectively reduces odd harmonics of the radio frequency signal.

* * * * *